United States Patent [19]
Vibert

[11] 4,051,544
[45] Sept. 27, 1977

[54] FAIL-SAFE GROUND FAULT RECEPTACLE CIRCUIT
[75] Inventor: Edward J. Vibert, Muncy, Pa.
[73] Assignee: GTE Sylvania Incorporated, Stamford, Conn.
[21] Appl. No.: 669,505
[22] Filed: Mar. 23, 1976
[51] Int. Cl.² ............................................. H02B 3/28
[52] U.S. Cl. ..................................................... 361/45
[58] Field of Search ................... 317/18 D, 18 R, 58, 317/33 SC, 60; 335/18, 170, 171; 337/66

[56] References Cited
U.S. PATENT DOCUMENTS

| 3,633,070 | 1/1972 | Vassos et al. | 317/18 D |
| 3,806,764 | 4/1974 | Hobson, Jr. et al. | 317/18 D |
| 3,813,579 | 5/1974 | Doyle et al. | 317/18 D |
| 3,852,642 | 12/1974 | Engel et al. | 317/18 D |
| 3,879,639 | 4/1975 | Sircom | 317/18 D |
| 3,931,601 | 1/1976 | Anderson | 317/18 D X |
| 3,973,171 | 8/1976 | Howell | 317/18 D |

Primary Examiner—J D Miller
Assistant Examiner—Patrick R. Salce
Attorney, Agent, or Firm—Norman J. O'Malley; Thomas H. Buffton; Robert T. Orner

[57] ABSTRACT

A fail-safe ground fault receptacle circuit includes a ground fault circuit interrupter inductively coupled to a load, directly coupled to one potential source terminal, and coupled by way of a series connected solenoid winding and contacts of a circuit breaker shunted by a series connected impedance and indicating lamp to another potential source terminal whereby manually closing the circuit breaker causes current flow through the solenoid winding shunting the indicator lamp and preventing activation thereof and excessive current flow through the solenoid winding opens the circuit breaker to cause current flow through and activation of the indicating lamp.

2 Claims, 1 Drawing Figure

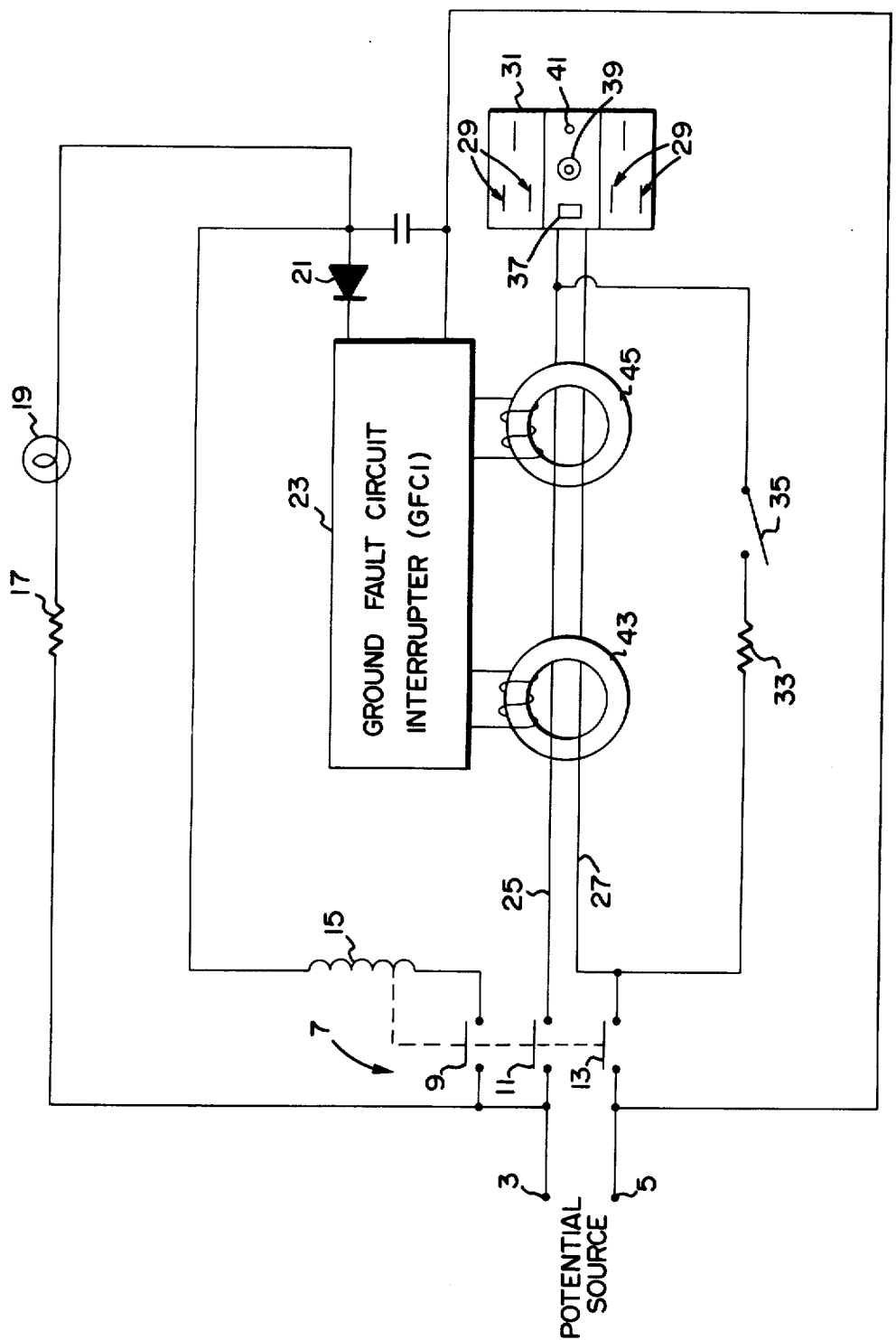

FAIL-SAFE GROUND FAULT RECEPTACLE CIRCUIT

BACKGROUND OF THE INVENTION

In a known form of ground fault receptacle circuit, the circuitry was arranged such that an indicating lamp is activated whenever power is applied to the receptacle contacts. In other words, an indicating lamp is activated whenever power is available at the contacts of the receptacle.

Although such ground fault receptacles have been and still are utilized in numerous applications, it has been found that such receptacles do leave something to be desired. For example, failure of the indicator lamp would incorrectly indicate that power is not present at the receptacle terminals even though it was. Obviously, such a condition represents a serious shock hazard. Also, a continuously activated indicator lamp offers an undesirable and continuous consumption of power. Moreover, failure of the indicating lamp will obviously occur more often when a continuously activated unit is employed.

OBJECTS AND SUMMARY OF THE INVENTION

An object of the present invention is to provide an enhanced fail-safe ground fault receptacle circuit. Another object of the invention is to reduce the power consumption of a fail-safe ground fault receptacle. Still another object of the invention is to improve the time period for indicating a ground fault in a ground fault receptacle. A further object of the invention is to provide an enhanced ground fault receptacle having an indicator which is activated when a ground fault occurs.

These and other and further objects, advantages and capabilities are achieved in one aspect of the invention by a fail-safe ground fault receptacle circuit having a load circuit means inductively coupled to a ground fault circuit interrupter. A solenoid and contact of a circuit breaker connecting the ground fault circuit interrupter to a potential source with series connected impedance and indicating lamp shunting the solenoid and contact and a direct connection of the ground fault circuit interrupter to the potential source whereby current flows through the solenoid winding and contact during normal operation and through the indicating lamp and impedance when the contact is opened by the ocurrance of a ground fault.

BRIEF DESCRIPTION OF THE DRAWINGS

The sole FIGURE is a preferred embodiment of a fail-safe ground fault receptacle circuit.

PREFERRED EMBODIMENT OF THE INVENTION

For a better understanding of the present invention, together with other and further objects, advantages and capabilities thereof, reference is made to the following disclosure and appended claims in conjunction with the accompanying drawing.

Referring to the drawing, a fail-safe ground fault receptacle circuit includes first and second potential input terminals 3 and 5 for coupling to a potential source. A circuit breaker 7 has a plurality of ganged contact member 9, 11, and 13 and a solenoid winding 15.

The first potential input terminal 3 is connected to the ganged contact members 9 and 11 of the circuit breaker 7 and to a series connected impedance 17 and indicating lamp 19. The series connected impedance 17 and indicating lamp 19 are connected by a diode 21 to a ground fault circuit interrupter unit (GFCI) 23. The second potential input terminal 5 is connected to a ganged contact member 13 of the circuit breaker 7 and to the GFCI 23.

The contact member 9 of the circuit breaker 7 is selectively connected to the solenoid winding 15 which is also coupled by the diode 21 to the GFCI 23. The contact members 11 and 13 of the circuit breaker 7 are connected by conductors 25 and 27 to the load terminals 29 of a receptacle box 31. Also, the contact member 13 of the circuit breaker 7 is coupled by a series connected resistor 33 and trip switch 35 to the conductor 25. Moreover, the receptacle box 31 includes a test button 37 for activating the trip switch 35, a circuit breaker reset button 39 for manually resetting the circuit breaker 7, and a location 41 for the above-mentioned indicating lamp 19.

Additionally the GFCI unit 23 includes a sensing means 43 and an oscillator means 45 inductively coupled to the conductors 25 and 27 for electrically supplying power to the load terminals 29 of the receptacle box 31. In a manner well known in the art, the GFCI unit 23 senses variation in current flow in either of the conductors 25 and 27 due to a ground fault condition and conveys the information to the GFCI unit 23.

As to operation, the circuit breaker 7 is manually closed by the circuit breaker button 39. Thereupon, a potential from the first potential input terminal 3 is applied to the series connected impedance 17 and indicating lamp 19 and to the circuit breaker winding 15. Since the impedance of the circuit breaker winding 15 is of a much lower value than the impedance of the series connected impedance 17 and indicating lamp 19, current will flow through the circuit breaker winding 15 and diode 21 to the GFCI unit 23. Thus, the indicating lamp 19 remains inactivated.

In a manner well-known in the art, the sensing means 43 detects the differential in current flow through the conductors 25 and 27. In other words, the current flow from the potential source to the load terminals 29 should be of the same value as the current returning from the load terminals 29 to the potential source. Should a current differential occur due to a current leakage path, the GFCI unit 23 will operate and, in effect, act as a short-circuit in series with the solenoid winding 15 and intermediate the first and second potential input terminals 3 and 5 of the potential source.

Thereupon, current flow through the solenoid winding 15 will be greatly increased and the circuit breaker 7 will be activated disconnecting the first and second potential input terminals 3 and 5 from the solenoid winding 15 and the conductors 25 and 27. However, the potential input terminals 3 and 5 remain connected to the series connected impedance 17 and indicating lamp 19. Moreover, current is provided in an amount sufficient to activate the indicating lamp 19 and provide a visual indication that the potential source has been disconnected from the load terminals 29.

Additionally, a test circuit including the resistor 33 and trip switch 35, activated by the test button 37, is provided to test the operation of the circuitry. Activation of the trip switch 35 simulates a leakage resistance coupled to the conductor 35 and serves as a test for correct operation of the GFCI unit 23 and the indicating lamp 19.

Thus, there has been provided a unique fail-safe ground fault receptacle circuit having numerous advantages over other known systems. For example, the present receptacle provides a visual indication whenever a power failure occurs. Thus, even if the visual indicating lamp should fail, there is no shock hazard since non-activation of the lamp would indicate that power was present. Also, power consumption of the apparatus is reduced due to the inactivation of the indicating lamp at all times except when the GFCI unit is activated. Moreover, activation of the GFCI unit causes the indicator lamp to provide a positive and immediate indication of a problem even in the dark.

While there has been shown and described what is at present considered the preferred embodiment of the invention, it will be obvious to those skilled in the art that various changes and modifications may be made therein without departing from the invention as defined by the appended claims.

What is claimed is:

1. A fail-safe ground fault receptacle circuit comprising:
   a pair of parallel connected female contacts formed to receive an electrical load;
   a GFCI unit;
   a potential source having first and second input terminals;
   circuit means including a series connected impedance and indicating lamp coupling said first input terminal of said potential source to said GFCI unit and conductor means directly connecting said second input terminal of said potential source to said GFCI unit; and
   circuit breaker means including a plurality of ganged contact members and a solenoid winding, one of said contact menbers selectively coupling said first input terminal of said potential source to said solenoid winding coupled to said GFCI unit, another of said contact members selectively coupling said first input terminal of said potential source to said female contacts and another of said contact members selectively coupling said second input terminal of said potential source to said female contacts whereby manually activating said circuit breaker means causes activation of said GFCI unit by current flow through said solenoid winding and de-energization of said indicating lamp and a ground fault causes activation of said GFCI unit which short circuits said solenoid to activate said circuit breaker and cause current flow through said indicating lamp.

2. The fail-safe ground fault receptacle circuit of claim 1 wherein said solenoid winding has an impedance value less than the impedance value of said series connected impedance and indicating lamp.